March 5, 1968  W. T. STOI ET AL  3,372,252
DIRECTION SIGNALING APPARATUS

Filed Oct. 7, 1966  2 Sheets-Sheet 1

INVENTORS
WALTER T. STOI
BY ROBERT THOMSON
*Learman & McCulloch*

March 5, 1968 W. T. STOI ET AL 3,372,252
DIRECTION SIGNALING APPARATUS

Filed Oct. 7, 1966 2 Sheets-Sheet 2

INVENTORS
WALTER T. STOI
ROBERT THOMSON
BY
*Learman + McCulloch*

United States Patent Office 3,372,252
Patented Mar. 5, 1968

3,372,252
DIRECTION SIGNALING APPARATUS
Walter T. Stoi, Warren, and Robert Thomson, Dearborn Heights, Mich., assignors to Boyne Products, Inc., Boyne City, Mich., a corporation of Michigan
Filed Oct. 7, 1966, Ser. No. 585,037
11 Claims. (Cl. 200—61.34)

ABSTRACT OF THE DISCLOSURE

Vehicle direction signaling apparatus having a support on which an actuator is mounted for rocking movement about an axis in either of two directions from a neutral position to a latched, turn indicating position in which a set of indicator lamps at one side or the other of a vehicle is actuated, the support and actuator having cooperable latch parts on the same side of the axis for latching the actuator in its turn indicating position and the support having an abutment engageable by the actuator latch on the opposite side of the axis, the arrangement being such that when the actuator is rocked about the axis in such direction as to effect latching engagement of one actuator latch part and the corresponding support latch, the other actuator latch engages the abutment on the support to arrest the actuator in an intermediate position in which the direction signal indicators at one side or the other of the vehicle are operative and from which position the actuator automatically is restored to its neutral position.

---

This invention relates to vehicle direction signaling apparatus and more particularly to a direction signaling device having an actuating member which may be moved manually from a neutral position to a latched turn indicating position or, at the election of the operator, to an intermediate turn indicating position from which it automatically may be returned to its neutral position upon its release by the operator.

In the operation of a motor vehicle, it frequently is desirable to indicate either a left-hand or right-hand turn in which event a direction signal actuating member may be moved from a neutral position to either a left-hand or right-hand turn indicating position and be latched in such position until the turn is completed, whereupon automatic canceling apparatus controlled by the steering mechanism functions to unlatch the actuator and permit its restoration to its neutral position. In other instances, however, the driver of a vehicle may wish to change from one traffic lane to another and, in heavy traffic conditions, such lane change should be signaled by the direction signaling apparatus. The amount of steering wheel movement necessary to effect a lane change, however, ordinarily is not enough to assure cancellation of an operating direction signal. Accordingly, the vehicle driver must cancel the direction signal manually. Unfortunately, not all drivers cancel the direction signal indicators following the changing from one lane to another. As a result, it is not uncommon for a vehicle to be driven for many miles in heavy traffic with its direction signal indicators operating. This can be both annoying and dangerous.

Apparatus of the general class to which the invention relates has been proposed heretofore. For example, the apparatus disclosed in copending applications Ser. Nos. 494,623 and 557,676, filed Oct. 11, 1965, and June 15, 1966, respectively, includes self-canceling lane change signaling mechanism. The apparatus disclosed herein is an improvement over the apparatus shown in the aforementioned applications.

An object of this invention is to provide improved direction signal operating apparatus which is capable of being latched in either a left-hand or right-hand turn indicating position, but also is capable of actuating momentarily the left-hand or right-hand direction signal indicators so as to indicate a lane change and which is so constructed as to be returnable automatically to the neutral or inactive position when the lane change has been completed.

Another object of this invention is to provide improved direction signaling apparatus of the character described and which operates in conjunction with the same parts which enable the direction signal actuator to be latched in an operating position, thereby making it unnecessary to provide parts in addition to those normally provided.

A further object of the invention is to provide improved direction signal operating apparatus of the character referred to and which enables the operator of the apparatus to sense the position in which the actuating apparatus is adjusted.

Another object of the invention is to provide direction signal operating apparatus having the characteristics described and which functions to relieve some of the stress to which currently used mechanisms of similar nature are subjected.

Other objects and advantages of the invention will be pointed out specifically or will become apparent from the following description when it is considered in conjunction with the appended claims and the accompanying drawings, in which:

Figure 1:
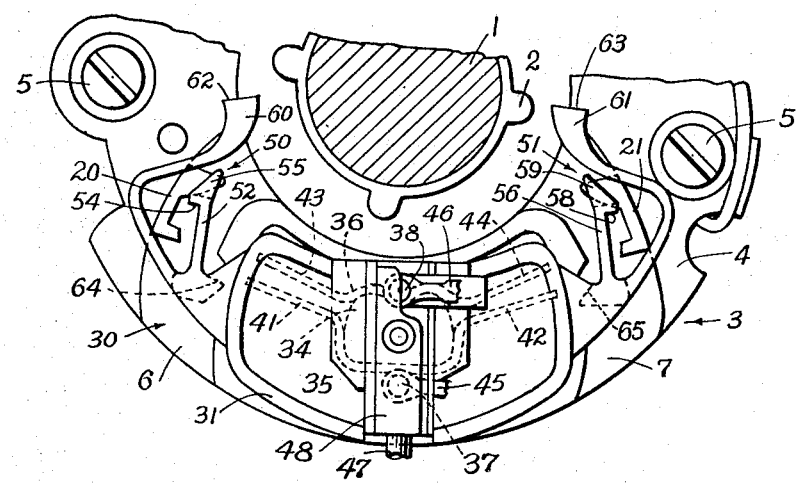
FIGURE 1 is a fragmentary, top plan view of direction signal apparatus constructed and arranged in accordance with the invention, the actuating member of the apparatus being shown in its neutral or inactive position.
Figure 2:
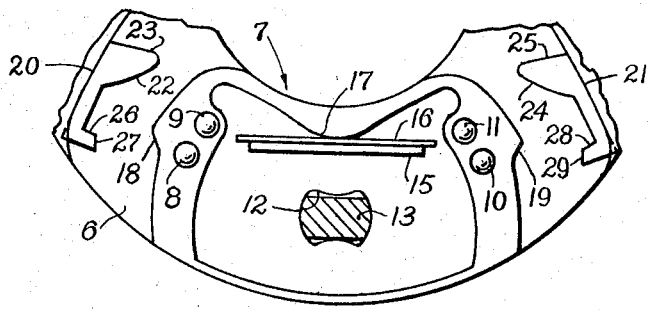
FIGURE 2 is a fragmentary view, partly in plan and partly in section of a support or casing forming part of the direction signal apparatus.

The construction herein disclosed has characteristics similar in many respects to the construction disclosed in United States Patent No. 3,239,619, granted Mar. 8, 1966, and to which reference may be had for a more detailed discussion of certain operating characteristics.

Apparatus constructed in accordance with the invention is adapted for use in conjunction with a vehicle having a rotatable steering member such as a shaft 1 mounted within a tubular column (not shown) and provided with one or more cam lobes 2 which rotate in response to rotation of the steering means. A support designated generally by the reference character 3 may have a mounting ring 4 that is secured to the steering column by screws 5 or the like. The support member 3 includes an arcuate base 6 formed of insulating material such as molded nylon and having between its ends a casing 7 in which are mounted left-hand and right-hand pairs of conductive switch contacts 8, 9, and 10, 11, respectively, which are adapted for connection to the left-hand and right-hand signaling lamps (not shown) of the vehicle. Between the pairs of contacts the casing is provided with a generally hour-glass opening 12 through which extends a rockable, substantially rectangular shaft 13. Between the pairs of contacts the base of the casing 7 is provided with an upstanding rib 15 against which bears a leaf spring 16 that extends above the rib 15 and which also bears against a fulcrum 17 molded into the casing 7. At opposite ends of the casing 7 is a pair of stop members 18 and 19, the purpose of which will be explained hereinafter.

Adjacent opposite ends of the casing 7, but spaced therefrom, the mounting member 4 is provided with a pair of integral, molded, upstanding, combined latch and abutment members 20 and 21. The member 20 includes an inclined cam surface 22 which extends generally toward the adjacent end of the casing 7 and terminates in a flat latching surface 23. The member 21 has a cam surface 24 similar to the cam surface 22 and a latching surface 25 corresponding to the latching surface 23. The member 20 also includes an abutment surface 26 terminating at its inboard edge in a flat surface 27. The member 21 includes a similar abutment surface 28 terminating at its inboard edge in a flat surface 29.

The apparatus includes an actuating member 30 having a generally arcuate body portion 31 molded of insulating material and having a rectangular opening between its ends for reception of the shaft 13 so as to be rockable with the latter. On the inner surface of the actuating member the opening is surrounded by a hub member 34 and against which are secured conductive switch members 35 and 36 that respectively engage contacts 37 and 38 which pass through correspondingly located openings formed in the body 31. The switch member 35 has arms 41 and 42 which, in the neutral position of the actuator 30, engage the fixed contacts 8 and 10, respectively, and the switch member has arms 43 and 44 which normally lie between the contacts 8 and 9 and 10 and 11, respectively, without engaging any of them. The contact 37 is adapted to be connected by a conductor 45 to the vehicle stop lamps through the conventional brake actuated switch and a battery or other source of electrical energy so as to enable the rear stop lamps of the vehicle to be illuminated upon depressing the brake pedal. The contact 38 is adapted for connection by a conductor 46 through a flasher unit (not shown) of conventional construction to the electrical energy source.

When the actuating member 30 is rocked from the neutral position shown in FIGURE 1 to either of its two turn indicating positions, the switch members 35 and 36 will rock with the operating member so as to engage and disengage the appropriate fixed contacts and enable the direction signaling lamps at either the left-hand side or the right-hand side of the vehicle to be flashed in the manner more fully explained in the aforementioned patent.

An operating handle or lever 47 is fixed to the shaft 13 by means of a coupling 48 so as to effect rocking movement of the actuator 30 either clockwise or counterclockwise from the neutral position shown in FIGURE 1.

At opposite ends of the actuator body 31 is a pair of flexible and resilient latch members 50 and 51. The latch member 50 comprises an arm 52 one end of which is integrally molded with the body 31. Adjacent its free end the arm 52 terminates in a laterally extending, hook-like leg 53 having a latching surface 54 which is adapted to engage the adjacent latch surface 23. A generally triangularly shaped projection 55 extends from the leg 53 toward the steering shaft 1. The upper surfaces of the leg 53 and the projection 55 are coplanar but the leg 53 is of substantially greater depth than that of the projection.

The latch member 51 includes a flexible, resilient leg 56 similar to the leg 52 and having a generally right-angular leg 57 provided with a latching surface 58 adapted to engage the latching surface 25 of the latch member 21. A generally triangularly shaped extension 59 similar to the projection 55 extends from the leg 57 toward the steering shaft 1.

Integrally molded at opposite ends of the actuator body 31 is a pair of flexible latch releasing arms or fingers 60 and 61, the arm 60 terminating in an end wall 62 that is adapted to engage any one of the cams 2. The finger 61 includes a similar wall 63. Adjacent the inner ends of the fingers 60 and 61 and on the inner surface of the actuator are molded integral stops 64 and 65 adapted for engagement with the stops 18 and 19 on the casing. Between its ends the inner surface of the body 31 is provided with a rib (not shown) that is adapted to engage and bear against the leaf spring 16.

Figure 3:
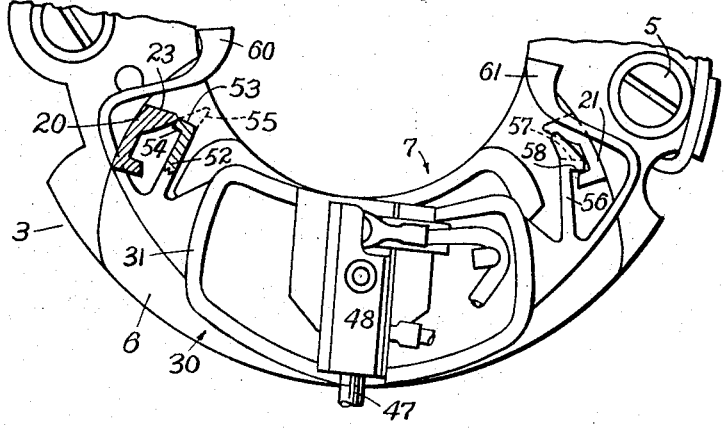
FIGURE 3 is a view similar to FIGURE 1, but illustrating the actuating member in a fully latched position; between its neutral position and one of its latched positions.

When the apparatus is mounted adjacent the steering shaft 1 in the manner indicated in FIGURE 1, the vehicle driver may indicate a turn by moving the operator lever 47 clockwise to the position shown in FIGURE 3, whereupon the actuating member 30 also will be rocked clockwise, thereby stressing the spring 16 which opposes such movement of the actuator. As the actuating member moves clockwise from its neutral position, the leg 53 of the latch member 50 will engage the cam surface 22 of the latch member 20 and deflect the arm 52 inwardly or toward the adjacent end of the body member 31. Simultaneously, the leg 56 at the opposite end of the body portion 31 will move clockwise relatively to the base 3 so as to cause the surface 58 of the leg 57 to engage the surface 28 of abutment 21. When the leg 56 engages the abutment 28, the resistance to further clockwise movement of the actuating member 30 will increase so as to arrest further movement of the actuator without the application of additional force on the lever 47. Such increase in the resistance to further movement of the actuator is sufficient to be detected readily by the driver. In this position of the actuating member, the switch member 36 will bridge the two contacts 9 and 10, the arm 41 of the switch member 35 will remain in engagement with the fixed contact 8, but the arm 42 will be out of engagement with the fixed contact 10. Thus, the contacts 9 and 10 will be in circuit with the flasher unit so as to effect flashing of the appropriate direction signaling lamps.

As has been stated, the movement of the actuator member from the position shown in FIGURE 1 to the position shown in FIGURE 3 causes the spring 16 to be stressed. Accordingly, should the driver release the handle 47, the spring will restore the actuating member to its neutral position.

Figure 4:
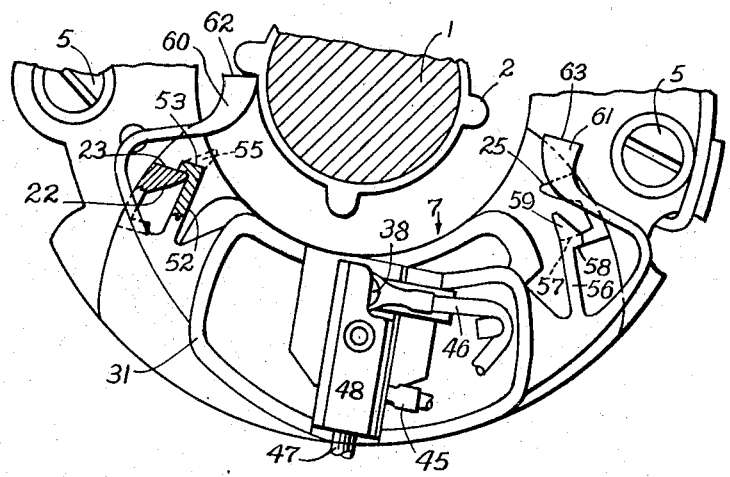
FIGURE 4 is a view similar to FIGURE 3, but illustrating the actuator member in a fully latched position.
Figure 5:
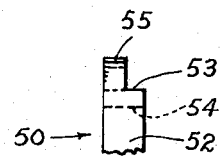
FIGURE 5 is a fragmentary detail.

When the actuating member 30 is in the position shown in FIGURE 3, the application of additional clockwise force on the lever 47 will cause the abutment 21 to deflect the flexible arm 56 further inwardly or toward the adjacent end of the body member 31 so as to enable further clockwise rocking of the actuating member. When the actuating member has been moved clockwise a distance sufficient to enable the leg 53 to clear the surface 22, the resiliency of the arm 52 will urge the latter outwardly or away from the adjacent end of the body 31 so as to engage the latch surfaces 23 and 54, thereby latching the actuating member in the position shown in FIGURE 4 and preventing the spring 16 from returning the actuating member to its neutral position. The extent of rocking movement of the actuator from the position shown in FIGURE 3 to the latched position shown in FIGURE 4 is not sufficient to effect any change in the electrical relation among the fixed and movable switch contacts. Clockwise movement of the actuating member is limited by engagement of the abutment 64 on the body 31 and the stop 18 on the member 7.

In the latched position of the actuating member shown in FIGURE 4, the return finger 60 lies in the path of rotation of the cams 2. Clockwise rotation of the cams 2 causes the finger 60 to be cammed away from the extension 55, but counterclockwise rotation of the cams 2 will cause one of them to seat against the wall 62 and deflect the arm 60 into engagement with the extension 55 so as to move the latter inwardly or toward the adjacent end of the body 31 an amount sufficient to disengage the cam surfaces 23 and 54. Upon disengagement of the cam surfaces, the spring 16 will restore the actuating member to its neutral position.

Although only clockwise rocking of the actuating member from its neutral position has been described, it will be understood that the actuating member also may be rocked counterclockwise from its neutral position to either a fully latched position or to an intermediate position between the fully latched position and the neutral position and that, in either the latched or the intermediate position, the appropriate fixed and movable switch contacts will be engaged to operate the direction signals at the other side of the vehicle.

One of the principal advantages of the construction disclosed herein is that the forces imposed on the actuating member are distributed on opposite sides of its axis of rotation. For example, the forces opposing clockwise movement of the actuator from its intermediate position shown in FIGURE 3 to its latched position shown in FIGURE 4 are applied partly on the member 50 and partly on the member 51. As a result, there is little tendency to cant the actuator.

Another advantage of the disclosed construction is that the latch and abutment members may be made of such thickness as to be quite resistant to breakage. Consequently, the useful life of the apparatus may be of considerable duration.

The disclosed embodiment is representative of a presently preferred form of the invention, but is intended to be illustrative rather than definitive thereof. The invention is defined in the claims.

We claim:

1. Direction signaling apparatus comprising a support member; an actuating member mounted on said support member for rocking movement about an axis in either of two directions from a neutral position to and beyond an intermediate position into either of two turn indicating positions; a first latch part carried by one of said members at one side of said axis; a second latch part carried by said one of said members at the other side of said axis; a third latch part carried by the other of said members at said one side of said axis and engageable by said first latch part in response to rocking in one direction of said actuating member from said neutral position for latching said actuating member in one of said turn indicating positions; a fourth latch part carried by said other of said members at the other side of said axis and engageable by said second latch part in response to rocking in the opposite direction of said actuating member from said neutral position for latching said actuating member in the other of said turn indicating positions; abutment means carried by said other of said members at least at one side of said axis and engageable with said first latch part in response to rocking of said actuating member in said opposite direction from said neutral position to arrest said actuating member in said intermediate position; operating means connected to said actuating member for rocking the latter; and electrically conductive contacts engageable in response to movement of said actuating member to either of said intermediate and turn indicating positions to condition a direction signaling circuit for operation.

2. Apparatus as set forth in claim 1 wherein the latch parts on one of said members are flexible.

3. Apparatus as set forth in claim 1 wherein said first and second latch parts are on said actuating member.

4. Apparatus as set forth in claim 1 including means acting on said actuating member and biasing the latter to said neutral position from said intermediate position.

5. Apparatus as set forth in claim 1 including means acting on said actuating member and biasing the latter to said neutral position from said direction indicating position.

6. Apparatus as set forth in claim 1 including latch release means carried by said actuating member and operable to effect disengagement of said first and second latch parts from their associated third and fourth latch parts.

7. Apparatus as set forth in claim 1 including second abutment means on said other of said members on the opposite side of said axis and engageable with said second latch part in response to rocking of said actuating member in said one direction from said neutral position to arrest said actuating member in said intermediate position.

8. Direction signaling apparatus comprising a support member; an actuating member having a body portion; means mounting said actuating member on said support for rocking movements about an axis between the ends of said body portion; operating means connected to said actuating member for rocking the latter in either of two directions about said axis from a neutral position to either one of two latched operating positions; first latch means carried by said actuating member adjacent each end of said body portion; second latch means carried by said support member adjacent each end of said body portion for latching engagement with said first latch means in response to movement of said actuating member to either of said operating portions; abutments carried by said support member adjacent each end of said body portion for engagement with said first latch means; and electrically conductive contacts on said members engageable in response to movement of said actuating member to either of said intermediate and third positions to condition a direction signaling circuit for operation, the arrangement of the respective latch means and abutments being such that rocking movement of said actuating member in a selected one of said directions from said neutral position toward one of said operating positions causes one of said first latch means to move toward latching engagement with the corresponding second latch means and causes the other one of said first latch means to move into engagement with the corresponding abutment and arrest said actuating member in an intermediate position between said neutral position and said one of said operating positions.

9. The apparatus set forth in claim 8 wherein said first latch means is flexible so that the first latch means in engagement with said abutment may yield and enable movement of said actuating member from said intermediate position to said operating position.

10. The apparatus set forth in claim 8 including means acting on said actuating member and biasing the latter to said neutral position from said intermediate position.

11. Apparatus as set forth in claim 8 including latch release means carried by said actuating member and operable to effect disengagement of said first and second latch means.

No references cited.

BERNARD A. GILHEANY, *Primary Examiner.*

GEORGE HARRIS, JR., *Examiner.*